Dec. 28, 1948.  R. O. STOKES ET AL  2,457,413
VIBRATOR
Filed Nov. 2, 1945  3 Sheets-Sheet 1

Dec. 28, 1948.  R. O. STOKES ET AL  2,457,413
VIBRATOR
Filed Nov. 2, 1945  3 Sheets-Sheet 2

Inventors:
Rupert O. Stokes,
and
George Kopp
By their attorneys

Dec. 28, 1948. R. O. STOKES ET AL 2,457,413
VIBRATOR
Filed Nov. 2, 1945 3 Sheets-Sheet 3

Inventors:
Rupert O. Stokes
George Koff
By their attorneys,
Baldwin & Wight

Patented Dec. 28, 1948

2,457,413

UNITED STATES PATENT OFFICE 2,457,413

VIBRATOR

Rupert Octavius Stokes and George Kopp, London, England

Application November 2, 1945, Serial No. 626,282
In Great Britain November 1, 1944

Section 1, Public Law 690, August 8, 1946
Patent expires November 1, 1964

8 Claims. (Cl. 74—87)

The invention relates to vibrators and has been devised primarily in connection with the vibrating screens disclosed in co-pending application Serial No. 626,281, filed November 2, 1945, but can be used for other purposes, as will be mentioned later.

According to the invention the vibrator comprises two bearings spaced apart, a rotary member mounted in the bearings and having a portion between the bearings adapted to swing away from the straight line joining the bearings to constitute an out-of-balance weight, a driving connection for applying power to the portion of the rotary member running in one bearing, and means for transmitting torque at starting from the last-named portion to the portion running in the other bearing.

Without the last named element, i. e., some torque transmitting means, a flexible out-of-balance rotary member might twist itself up instead of acting in the desired manner. If the rotary member has sufficient torsional rigidity to overcome the friction of the bearing remote from the drive end, this member may itself constitute the torque transmitting means, especially if it is tensioned to lie approximately in a straight line when stationary.

The invention is illustrated by three forms of construction shown in the accompanying drawings, in which the three figures are longitudinal sections through the three vibrators.

Figure 1:
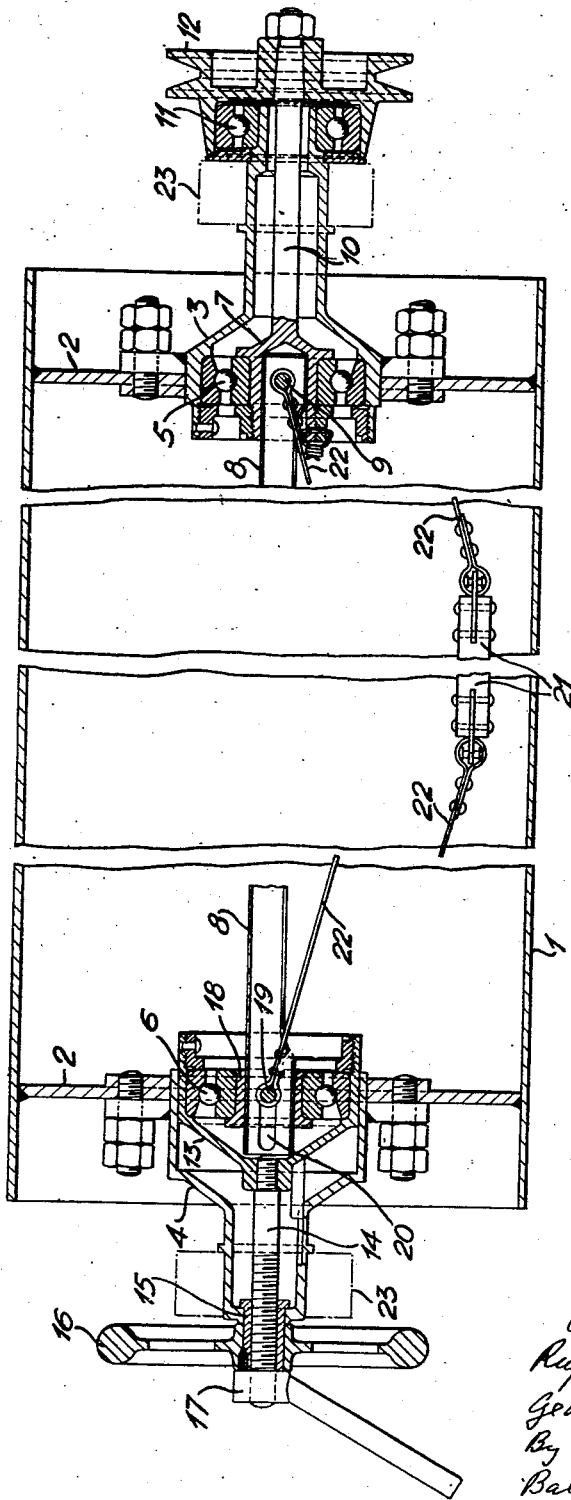

Figure 1 shows a vibrator intended to run at 2,000 R. P. M. and having an 8 ounce weight running at a maximum radius of 3 inches, which gives a pull of 170 lbs.

A vibrator is contained in a thin steel tube or roller 1, about 3 feet long and 8 inches diameter. At a short distance in from each end radial parts such as closure discs 2, 2 are welded in the roller 1 and carry central trunnions 3, 4 to support main ball bearings 5, 6. At the right hand end, which may be referred to as the drive end, the ball bearing 5 carries in its inner race a fitting 7 at one end of a torque tube 8. The latter is a thin metal tube extending practically the whole length of the roller 1 and open at the lower side in the position shown over the greater part of its length. The fitting 7 comprises a cup-shaped part fitting into the bearing 5 and holding the end of the torque tube 8 by an anchor pin 9. It also comprises a shaft part 10.

The trunnion 3 is extended to carry a ball bearing 11 on its outer end, on the outer race of which is fixed a grooved sheave 12 for a cord drive. The sheave 12 is also tight on the end of the shaft 10.

At the left hand end, which may be called the adjustment end, the bearing 6 is not mounted direct in the trunnion 4 but in a sliding housing 13 adapted to move longitudinally within the trunnion 4. The housing 13 is connected to a central adjustment spindle 14, the outer end of which is threaded over a considerable length. The trunnion 4 has a projecting part to enclose the spindle 14, and at the end a nut 15 screwed to fit the spindle is rotatably fixed by a flange on the inside and a hand wheel 16 on the outside. A lock nut 17 secures the adjustment made by rotating the hand wheel 16.

The housing 13 has the ball bearing 6 fixed inside it, and the inner race of the bearing has an anchor bush 18 fixed into it which can slide on the torque tube 8. An anchor pin 19 is fitted transversely inside the anchor bush 18 and passes through longitudinal slots 20 in the torque tube 8.

A weight bar 21 about ½ inch diameter and rather over 7 inches long lies parallel to the roller axis. Its two ends are hinged to tension strips 22, 22 about 12½ inches long, which are themselves hinged to the two anchor pins 9 and 19. Adjustment by means of the hand wheel 16 can move the weight bar 21 from its maximum radius of revolution at 3 inches from the centre of the roller 1 to a position practically at the centre. The out-of-balance effect can thereby be varied to suit circumstances.

When the sheave 12 is driven, the torque tube 8 ensures that the anchor bush 18 and its pin 19 will revolve at the same speed as the pin 9 and its fitting 7. The weight bar 21 will thus revolve in the manner of a skipping rope and provide the out-of-balance effect desired. The chain-dotted rectangles 23, 23 denote supports for the structure to permit it to rotate, e. g., on a filter drum, so that it does not always hit the drum along the same generatrix.

Figure 2:
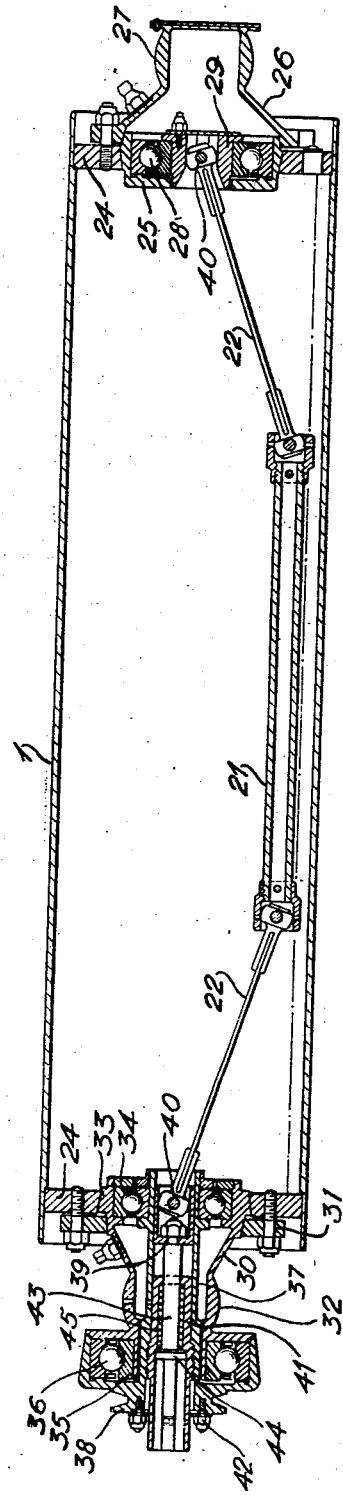

The arrangement shown in Figure 2 differs from that of Figure 1 in that the torque tube is omitted and the adjustment of the stroke is effected at the drive end. A tube or roller 1 encloses the mechanism and has a plate 24 fixed in each end. By the wedging action of conical surfaces a bearing housing 25 and a trunnion 26 are fixed to the plate 24 at the right hand or blind end. The trunnion has a spherical portion 27, by which it is attached to a support as in the case of Figure 1. A ball bearing 28 in the housing 25 journals a hub 29, which is thus free to rotate.

At the left hand or driving end a trunnion 30 is fixed to the plate 24 by the wedging action of conical surfaces with the aid of a loose flange 31. The trunnion 30 has a spherical portion 32 by which it also is attached to the support. As in the case of Figure 1 the roller 1 is itself the structure to be vibrated. In addition the trunnion is extended inwards to form a bearing housing 33, in which the outer race of a ball bearing 34 is mounted, and outwards to form a seating 35, on which the inner race of a ball bearing 36 is fixed.

The outer race of the bearing 36 and the inner race of the bearing 34 support a quill 37, which is integral with a grooved driving sheave 38. An anchor cup 39 can slide longitudinally in the quill 37 but is not capable of rotation in relation to the quill. An eccentric weight 21 is hinged at its two ends to tension strips 22, 22, which in turn are hinged by anchor pins 48, 49 to the anchor cup 39 and the hub 29 respectively.

An adjustment plunger 41 is screwed into the quill 37 and is shown in the position for maximum swing of the weight 21. For a reduced radius of swing the plunger 41 can be unscrewed and its adjustment fixed by a lock plate 42. An adjustment bolt 43 is fixed to the anchor cup 39 and can slide in the plunger 41. In its extreme right hand position shown in the figure a flange 44 on the bolt 43 abuts against an internal shoulder in the plunger 41, and this is the position assumed in operation. A resetting spring 45 bears on the flange 44 and on an internal flange at the end of the plunger 41, which pushes the bolt 43 to the left hand when the vibrator is stationary and thereby sets the weight 21 and the strips 22 in a practically straight line between the bearings. When starting from rest the rigidity of the weight and strips and their joints is ample to overcome any friction at the blind end of the vibrator.

Figure 3:
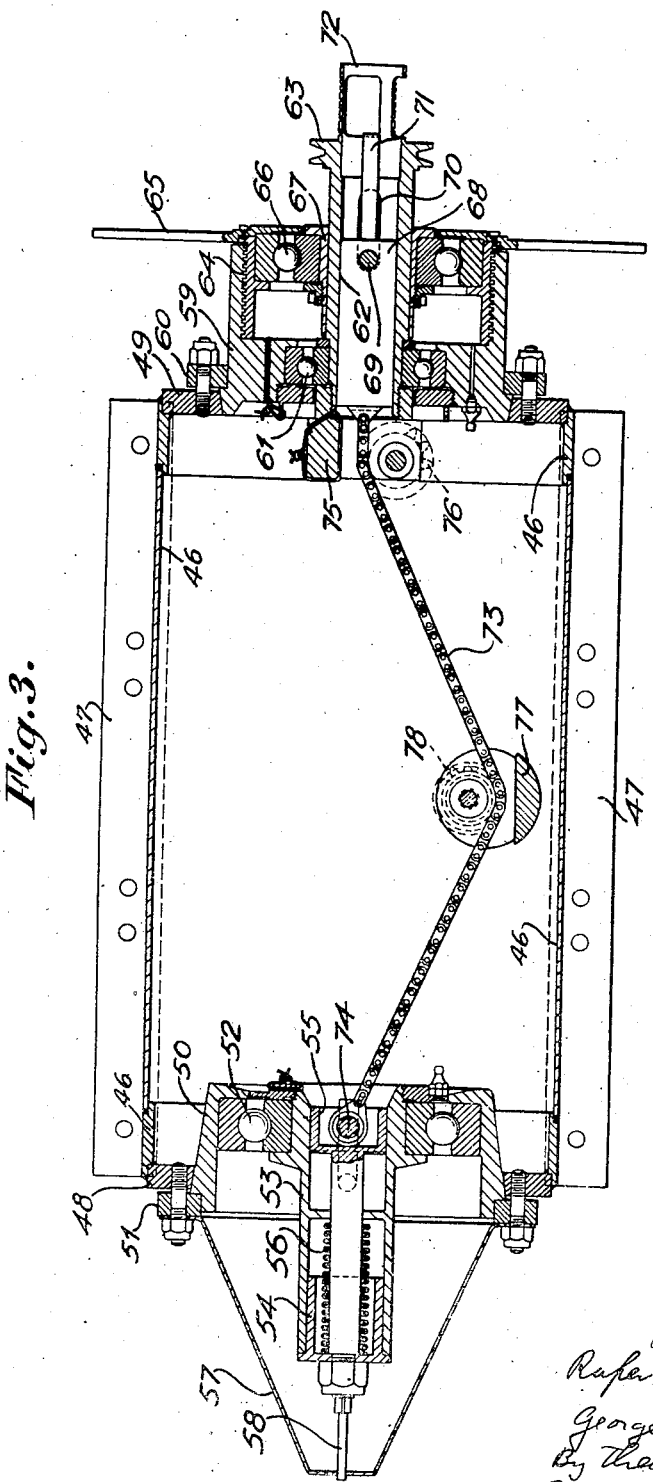

Another form of vibrator is shown in Figure 3, which again dispenses with the torque tube of Figure 1. This arrangement is of particular use when the reactions produced on the vibrated structure are required always to be symmetrical whatever the setting.

The housing 46 is fixed to the structure to be vibrated by flanges 47, 47 and is provided with end plates 48, 49 to carry the parts about to be described. The end plate 48 at the left hand or resetting end has a bearing housing 50 clamped to it with the aid of a loose flange 51. A ball bearing 52 is fixed in the housing 50 and has a quill 53 fixed to its inner race. A plunger 54 fixed to an anchor 55 is free to slide in the quill 53, being urged to the left by a resetting spring 56. A light cover 57 attached to the flange 51 protects the quill 53, but a stem 58 projecting from the plunger 54 protrudes through a hole in the end of the cover 57 to form a resetting indicator.

The end plate 49 at the right hand or drive end likewise has a housing 59 clamped to it with the aid of a loose flange 60. A ball bearing 61 in the housing supports one end of a quill 62, which has an integral grooved sheave 63 for a cord drive. An outer adjustment sleeve 64 is held in the housing 59 by square threaded screw engagement and can be rotated by means of a capstan wheel 65 to vary its axial position. As shown in the figure it is in its position furthest to the left to provide maximum radius of swing of the out-of-balance weight.

The sleeve 64 carries a ball bearing 66, which has fixed in its inner race an inner adjustment sleeve 67 capable of sliding along the quill 62. The bearing 66 through the other parts just described forms a second journal for the quill 62. An anchor 68 is adapted to slide axially in the quill 62 and is fixed by a pin 69 to the sleeve 67. Two slots opposite each other in the quill 62, one of which is shown at 70, permit the anchor 68 and the pin 69 to have the required range of movement. An extension shaft 71 on the anchor 68 cooperates by its end with an extension 72 of the quill 62 to form an indicator for the position of the anchor 68.

A chain 73 of the same kind as a driving chain is fixed at one end by an anchor pin 74 to the resetting anchor 55 and at the other end to the anchor 68. A housing 75 fixed to the quill 62 carries a jockey pinion 76, which engages the chain 73 and is so positioned that the portion of chain between it and the anchor 68 lies along the axis of the bearings. An eccentric weight 77 has a jockey pinion 78 mounted on it to be freely rotatable, and it is thereby hung on the chain 73 with freedom to travel along the chain.

When the vibrator is at rest, the chain 73 is stretched to a nearly horizontal position by the spring 56. In this condition the chain has sufficient rigidity to transmit the drive when starting to the resetting end. When running, the pin 74 always occupies the position shown in the figure, which is determined by the abutment of the plunger 54 on the end of the quill 53. The jockey pinion 76 also occupies a fixed position irrespective of any adjustment of the sleeve 64 to vary the out-of-balance effect. The weight 77 therefore always swings at the same position midway between these two supports.

A further alternative construction is to omit the weight 77 and to make the chain 73 of sufficient weight itself to act as the out-of-balance weight. In this arrangement the chain assumes a catenary shape when revolving. The radius to its centre of gravity is smaller than the dip of the chain, which involves larger housings or rollers than when a concentrated weight like 77 is used, but the slope of the tangents to the catenary at the anchor pins is greater than the slope of the straight lines joining the anchor pins to the centre of gravity, and thus the thrust on the bearings is considerably less.

The weight of the roller 1 or 46 with all its fittings is very much less than that of an eccentric shaft which would be required for the same duty. In the case of a wide member, such as a wide vibrating screen, an eccentric shaft would give rise to serious problems due to critical speeds, which would make such a drive impossible at the high speeds desired, unless a heavy shaft is used, which would again increase the mass to be set in vibration.

If a wide member of the kind envisaged is made to vibrate by a vibrator of the hitherto known kind which is short enough not to involve critical speed problems, the member itself has to be made rigid, and hence heavy, so as to vibrate with the same amplitude, frequency and phase at all its points. The heavier mass to be set into vibration thus increases the power demanded of the vibrator and accordingly also its weight.

A vibrator according to the present invention applied to a wide member would in practice always be made to extend over the whole width of the member to which it is attached. No extra weight is then involved either to meet critical speed problems or to make the vibrated member very rigid, with the result of a saving in both weight and driving power.

Even where the member to be vibrated is narrow the invention will still show an economy in power owing to the smaller weight of the roller and the consequently smaller dead weight to be vibrated.

Besides the use of the invention on a vibrating screen as mentioned above, it can be used for tamping, for vibrating concrete moulding boxes, and for other like applications. One interesting application is to a filter drum.

What we claim is:

1. A vibrator for a reciprocating structure, comprising a substantially cylindrical casing including substantially radial parts near the respective ends of the casing, a bearing on each radial part coaxial with the casing, an axially movable member mounted to rotate in a first of said bearings, an elongated member mounted by one of its ends for rotation in the second of said bearings and mounted by its other end on said axially movable member, both ends of said elongated member being mounted in the bearing axis and said elongated member normally lying in the bearing axis but being capable of flexing to bring the major part of it out of said axis when the axially movable member moves toward said second bearing, thereby to constitute an out-of-balance weight, and a driving member connected to one end of said elongated member.

2. A vibrator for a reciprocating structure, comprising a substantially cylindrical casing, a closure member near each end of the casing, a bearing in each closure member coaxial with the casing, an axially movable member mounted to rotate in a first of said bearings, an elongated member mounted by one of its ends for rotation in the second of said bearings and mounted by its other end on said axially movable member, said elongated member normally lying in the bearing axis but being capable of flexing to bring the major part of it out of the axis when the axially movable member moves towards said second bearing, thereby to constitute an out-of-balance weight, a driving member connected to an end of the elongated member and projecting beyond the associated bearing, and means for transmitting the driving torque to the opposite end of the elongated member.

3. A vibrator for a reciprocating structure, comprising a substantially cylindrical casing, a closure member near each end of the casing, a bearing in each closure member coaxial with the casing, an axially movable member mounted to rotate in a first of said bearings, an elongated member mounted by one of its ends for rotation in the second of said bearings and mounted by its other end on said axially movable member, said elongated member normally lying in the bearing axis but being capable of flexing to bring the major part of it out of the axis when the axially movable member moves towards said second bearing, thereby to constitute an out-of-balance weight, a driving member connected to an end of the elongated member and projecting beyond the associated bearing, and a tube journalled in the two bearings with positive driving connections to both ends of the elongated member.

4. A vibrator for a reciprocating structure, comprising a substantially cylindrical casing, a closure member near each end of the casing, a bearing in each closure member coaxial with the casing, an axially movable member mounted to rotate in a first of said bearings, an elongated member mounted by one of its ends for rotation in the second of said bearings and mounted by its other end on said axially movable member, said elongated member normally lying in the bearing axis but being capable of flexing to bring the major part of it out of the axis when the axially movable member moves towards said second bearing, thereby to constitute an out-of-balance weight, a driving member connected to an end of the elongated member and projecting beyond the associated bearing, and resilient means applying tension to the elongated member and tending to bring it into an axial position, the elongated member having sufficient torsional rigidity to transmit the torque from the driving connection to the end of the elongated member remote from the driving connection.

5. A vibrator for a reciprocating structure, comprising a substantially cylindrical casing, a closure member near each end of the casing, a bearing in each closure member coaxial with the casing, an axially movable member mounted to rotate in a first of said bearings, an elongated member assembly mounted by one of its ends for rotation in the second of said bearings and mounted by its other end on said axially movable member, said elongated member assembly consisting of three rigid portions pivotally connected end to end and normally lying in the bearing axis with the ends pivotally connected to their supporting members but being capable of swinging out of the axis by the action of the pivots to constitute an out-of-balance weight, a driving member connected to an end of the elongated member assembly and projecting beyond the associated bearing, and means for transmitting the driving torque to the opposite end of the elongated member assembly.

6. A vibrator for a reciprocating structure, comprising a substantially cylindrical casing, a closure member near each end of the casing, a bearing in each closure member coaxial with the casing, an axially movable member mounted to rotate in a first of said bearings, an elongated member mounted by one of its ends for rotation in the second of said bearings and mounted by its other end on said axially movable member, said elongated member normally lying in the bearing axis but being capable of flexing to bring the major part of it out of the axis when the axially movable member moves towards said second bearing, thereby to constitute an out-of-balance weight, a driving member connected to an end of the elongated member and projecting beyond the associated bearing, an abutment to limit the movement of said axially movable member towards the second bearing, and means for adjusting the axial position of the abutment, whereby the maximum movement of the elongated member away from the axis may be varied.

7. A vibrator for a reciprocating structure comprising a substantially cylindrical casing, a closure member near each end thereof, a bearing in each closure member coaxial with the casing, a tubular member rotatable in one bearing, a support member movable axially in the tubular member, resilient means urging the said support member away from the other bearing, a second tubular member rotatable in the other bearing, a support member movable axially in the said second tubular member, adjustment means positively determining the axial position of the last-named support member, driving means for imparting rotation to one of the tubular members, and a chain connected by its two ends to the two support members to lie in the axis when stationary and to swing out of the axis when rotated.

8. A vibrator as defined in claim 7 having a weight suspended on the chain by a sprocket so as to be freely movable on the chain in the axial direction.

RUPERT OCTAVIUS STOKES.
GEORGE KOPP.

REFERENCES CITED

The following references are of record in the file of this patent:

UNITED STATES PATENTS

| Number | Name | Date |
|---|---|---|
| 1,071,706 | Combs | Sept. 2, 1913 |
| 1,583,640 | Zitzerman | May 4, 1926 |

FOREIGN PATENTS

| Number | Country | Date |
|---|---|---|
| 5,561 | Great Britain | Mar. 15, 1893 |
| 410,705 | Great Britain | May 24, 1934 |
| 129,768 | Germany | May 22, 1901 |